United States Patent
Moriyama et al.

(10) Patent No.: US 12,333,078 B2
(45) Date of Patent: Jun. 17, 2025

(54) CONTROL APPARATUS, CONTROL METHOD, AND CONTROL SYSTEM FOR FORCE-SENSE DEVICE

(71) Applicant: SONY GROUP CORPORATION, Tokyo (JP)

(72) Inventors: Taha Moriyama, Tokyo (JP); Yusuke Nakagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/550,291

(22) PCT Filed: Feb. 18, 2022

(86) PCT No.: PCT/JP2022/006708
§ 371 (c)(1),
(2) Date: Sep. 13, 2023

(87) PCT Pub. No.: WO2022/202021
PCT Pub. Date: Sep. 29, 2022

(65) Prior Publication Data
US 2024/0184376 A1 Jun. 6, 2024

(30) Foreign Application Priority Data
Mar. 23, 2021 (JP) ................................ 2021-048634

(51) Int. Cl.
*G06F 3/01* (2006.01)
(52) U.S. Cl.
CPC .............. *G06F 3/016* (2013.01); *G06F 3/014* (2013.01)
(58) Field of Classification Search
None
See application file for complete search history.

(56) References Cited

U.S. PATENT DOCUMENTS

2020/0142485 A1* 5/2020 Ma .......................... B32B 5/026

FOREIGN PATENT DOCUMENTS

| JP | 2002-182817 A | 6/2002 |
| JP | 2016-062428 A | 4/2016 |

(Continued)

OTHER PUBLICATIONS

International Search Report and Written Opinion of PCT Application No. PCT/JP2022/006708, issued on Apr. 26, 2022, 09 pages of ISRWO.

*Primary Examiner* — Brian M Butcher
(74) *Attorney, Agent, or Firm* — CHIP LAW GROUP

(57) ABSTRACT

Provided are a control apparatus, a control method, and a system for a force-sense device that can apply a more natural haptic sensation. According to the present disclosure, a control apparatus for a force-sense device has a position information acquiring section for acquiring position information regarding a surface of a virtual object and position information regarding a fingertip, and a control section for controlling the position of an acting portion that applies a force to the fingertip, in reference to the pieces of position information, and the control section makes a second force weaker than a first force, the first force being applied to the acting portion in a first direction away from the surface of the virtual object in a case where the fingertip is pushed in further beyond the surface of the virtual object, and the second force being applied in a second direction opposite to the first direction in a case where the fingertip is to be placed back from the position where the fingertip has been pushed in.

9 Claims, 14 Drawing Sheets

(56) References Cited

FOREIGN PATENT DOCUMENTS

| JP | 2019-117459 A | 7/2019 |
| JP | 2020-194465 A | 12/2020 |

\* cited by examiner

DURING BEND

DURING EXTENSION

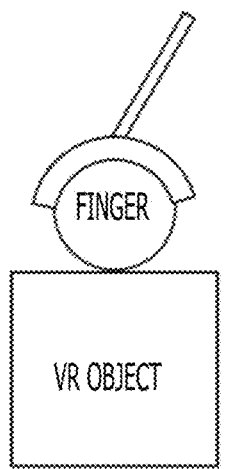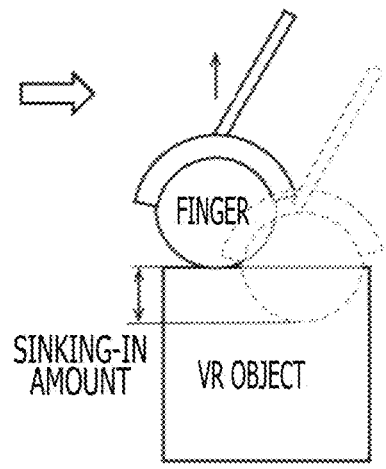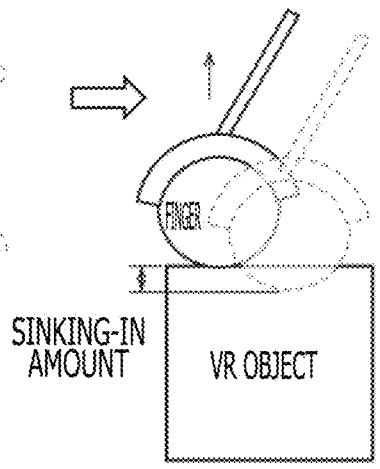
FIG. 16A  FIG. 16B  FIG. 16C
FIRST CORRECTION IS PERFORMED ON Vn, BASED ON B, WHEN FINGER IS DETACHED FROM OBJECT
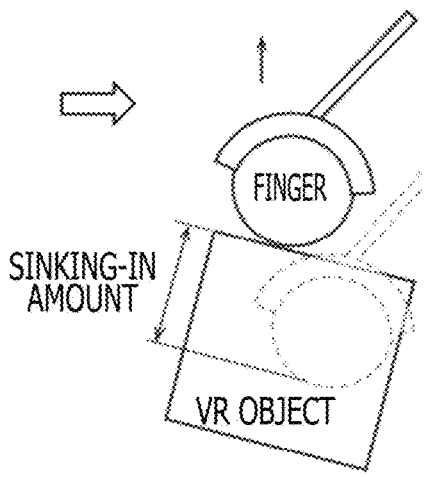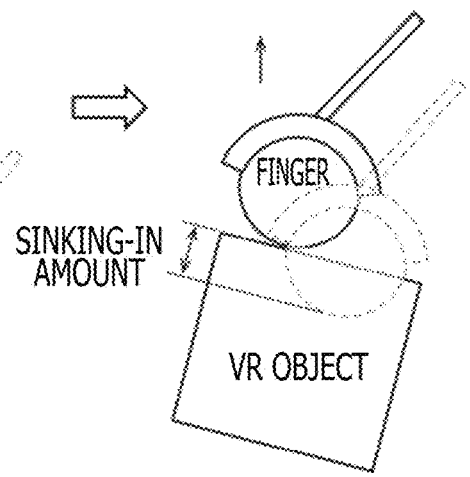
FIG. 16D  FIG. 16E
RE-PUSHING MOTION WITHOUT DETACHING FINGER FROM OBJECT
NEXT CORRECTION IS PERFORMED ON Vn, BASED ON D, WHEN FINGER IS DETACHED FROM OBJECT

CONTROL APPARATUS, CONTROL METHOD, AND CONTROL SYSTEM FOR FORCE-SENSE DEVICE

TECHNICAL FIELD

The present disclosure relates to a control apparatus, a control method, and a control system for a force-sense device.

BACKGROUND ART

Advances in image processing technology and expansion of network environments have made it possible to easily enjoy electronic content such as videos and games in various forms. For example, using a head-mounted display to display a virtual object in a field of view corresponding to the face direction of the user who is wearing it and giving a sense of force for the virtual object with a force-sense device make it possible to enhance the sense of immersion in the visual world and improve the operability of applications such as games. In addition, among such operation devices, there are also ones that use actuators or the like to present a sense of force to the user.

CITATION LIST

Patent Literature

PTL 1

Japanese Patent Laid-open No. 2020-194465

SUMMARY

Technical Problem

However, in force-sense processing for a virtual object, force may be applied in the direction in which the user tries to detach the finger from the virtual object, which may cause a feeling of strangeness.

Accordingly, the present disclosure provides a control apparatus, a control method, and a system for a force-sense device capable of giving a more natural sense of force.

Solution to Problem

In order to solve the above problem, according to the present disclosure, there is provided a control apparatus for a force-sense device, including a position information acquiring section that acquires position information regarding a surface of a virtual object and position information regarding a fingertip, and a control section that controls a position of an acting portion that applies a force to the fingertip, in reference to the pieces of position information. The control section makes a second force weaker than a first force, the first force being applied to the acting portion in a first direction away from the surface of the virtual object in a case where the fingertip is pushed in further beyond the surface of the virtual object, and the second force being applied in a second direction opposite to the first direction in a case where the fingertip is to be placed back from the position where the fingertip has been pushed in.

The control section may fix the position of the acting portion such that the fingertip does not move, in a case where the position of the surface of the virtual object and the position of the fingertip have a predetermined relation.

The control section may cancel the fixation in a case where the fingertip moves in the first direction.

The acting portion is fixed to the manipulator, and the control section may control a voltage of a motor that drives the manipulator.

The first direction may be a direction normal to the surface of the virtual object.

The control section may control a first voltage of a motor that applies a force to the acting portion in the first direction and a second voltage of a motor that applies a force in the second direction.

The control section may perform control to set the second voltage to 0 or bring the second voltage close to 0 in the case of cancelling the fixation.

The control section may perform control to suppress the second voltage by correction processing for reducing the second voltage.

The control section performs feedback processing for moving the fingertip to a target position based on the surface of the virtual object, and may perform the correction processing after the feedback processing is completed.

The control section may perform the correction processing when the virtual object is a movable object and after the virtual object stops in conjunction with the movement of the fingertip.

The control section may stop the correction processing in a case where the virtual object itself moves.

The control section may change the degree of correction for reducing the second voltage, according to a length of contact time between the surface of the virtual object and the fingertip.

The control section may maintain the second voltage of a predetermined value, in the case where the surface of the virtual object has an attribute indicating viscosity.

In order to solve the above problem, according to the present disclosure, there is provided a method of controlling a force-sense device, the method including a position information acquiring step of acquiring position information regarding a surface of a virtual object and position information regarding a fingertip, and a controlling step of controlling a position of an acting portion that applies a force to the fingertip, in reference to the pieces of the position information, the controlling step including making a second force weaker than a first force, the first force being applied to the acting portion in a first direction away from the surface of the virtual object in a case where the fingertip is pushed in further beyond the surface of the virtual object, and the second force being applied in a second direction opposite to the first direction in a case where the fingertip is to be placed back from the position where the fingertip has been pushed in.

In order to solve the above problem, according to the present disclosure, there is provided a control system for a force-sense device, including an image processing apparatus that displays a virtual object in a virtual space corresponding to the real space, and a control apparatus that controls a force-sense device that gives a sense of force to a fingertip of a user, the control apparatus including a position information acquiring section that acquires position information regarding a surface of an object R and position information regarding the fingertip, and a control section that controls a position of an acting portion that applies a force to the fingertip in reference to the position information, and the control section making a second force weaker than a first force, the first force being applied to the acting portion in a first direction away from the surface of the virtual object in a case where the fingertip is pushed in further beyond the surface of the virtual object, and the second force being applied in a second direction opposite to the first direction in the case where the fingertip is to be placed back from the position where the fingertip has been pushed in.

BRIEF DESCRIPTION OF DRAWINGS

FIGS. 16A, 16B, 16C, 16D, and 16E depict diagrams illustrating an example of control by the driving force control section in a case where the finger is pushed in without being detached.

DESCRIPTION OF EMBODIMENT

Hereinafter, an embodiment of a control apparatus, a control method, and a control system for a force-sense device will be described with reference to the drawings. Although the main components of the control system will mainly be described below, the control system may have components and functions that are not illustrated or described. The following description does not exclude components or features not illustrated or described.

First Embodiment

First Embodiment

Figure 1:
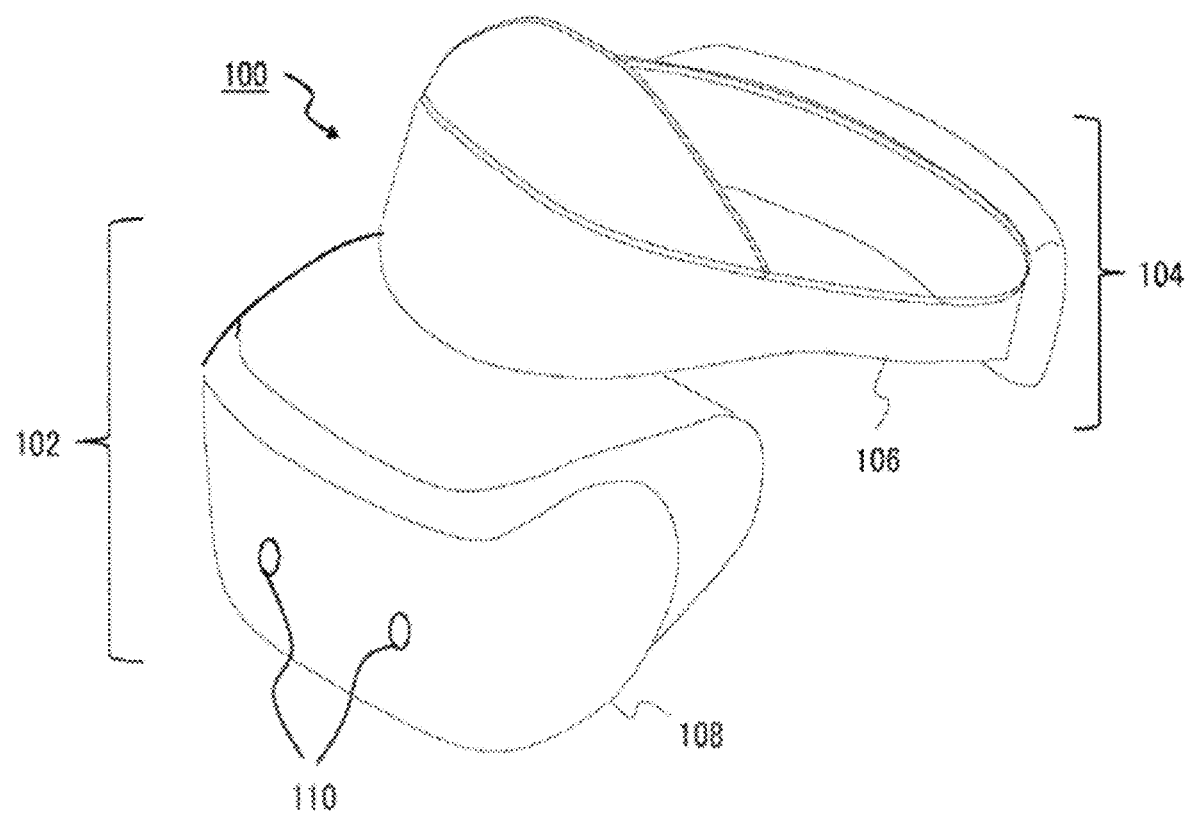
FIG. 1 is a diagram illustrating an appearance example of a head-mounted display according to the present embodiment.

In the present embodiment, a mode of displaying an image on a head-mounted display will mainly be described, as a typical example. FIG. 1 is a diagram illustrating an appearance example of a head-mounted display according to the present embodiment. In this example, a head-mounted display 100 includes an output mechanism portion 102 and a mounting mechanism portion 104. The mounting mechanism portion 104 includes a mounting band 106 that is, when worn by the user, wound around the head to fix the apparatus.

The output mechanism portion 102 includes a housing 108 shaped to cover the right and left eyes when the head-mounted display 100 is worn by the user, and has a display panel provided inside in such a manner as to face the eyes at the time when the user is wearing the display. The housing 108 may further include lenses which are positioned between the display panel and the user's eyes when the head-mounted display 100 is worn and which magnifies the images. Stereoscopic visions may be achieved by displaying a stereo image corresponding to binocular parallax in each region obtained by dividing the display panel into right and left.

The head-mounted display 100 may further include speakers or earphones at positions corresponding to the ears of the user when being worn. In this example, the head-mounted display 100 includes a stereo camera 110 on the front surface of the housing 108, and captures moving images of the surrounding real space in a field of view corresponding to the line of sight of the user. Further, the head-mounted display 100 may include any one of various sensors such as an acceleration sensor, a gyro sensor, and a geomagnetic sensor inside or outside the housing 108 for deriving the movement, attitude, position, etc., of the head-mounted display 100.

Figure 2:
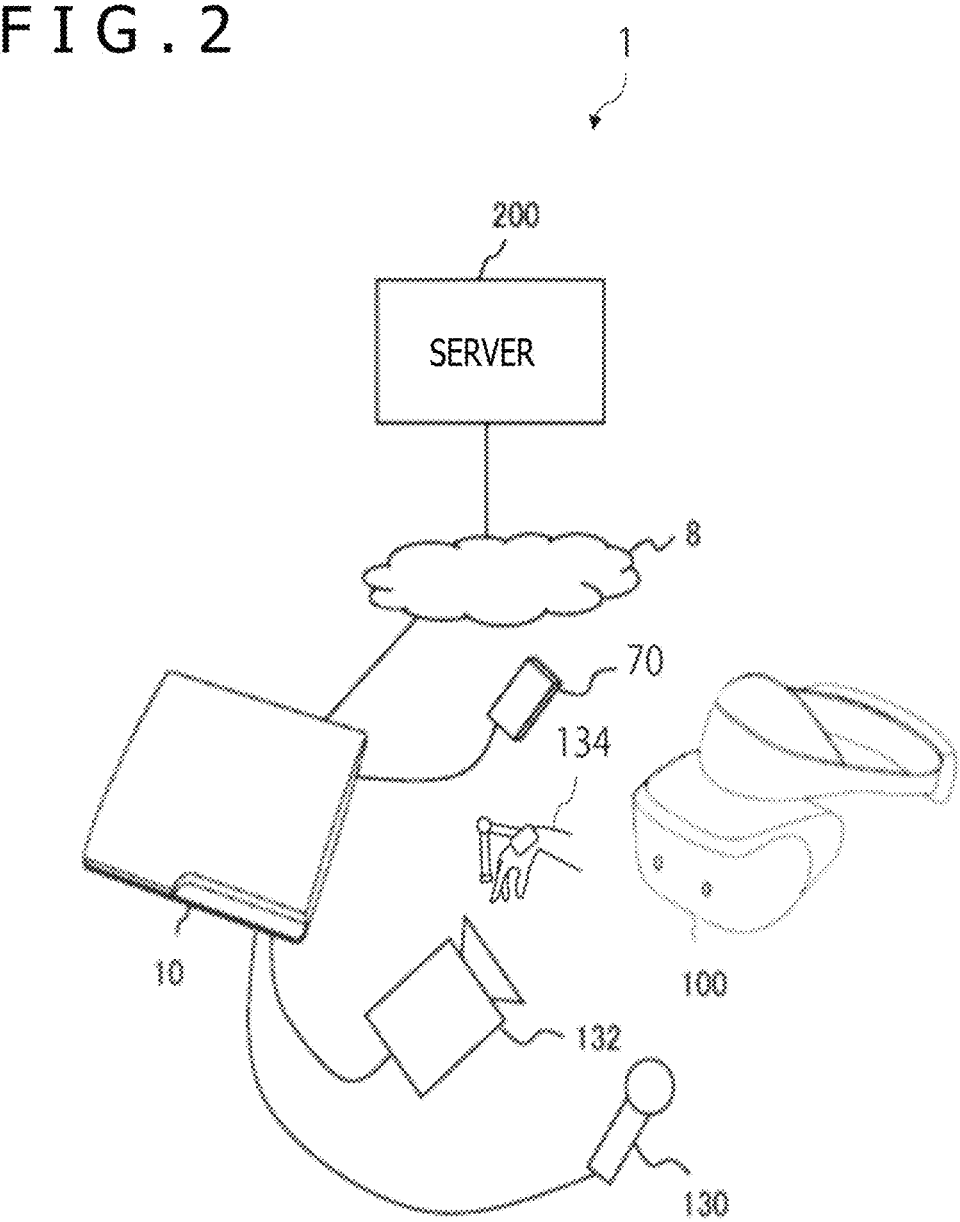
FIG. 2 is a diagram illustrating a configuration example of a control system for a force-sense device.

FIG. 2 is a diagram illustrating a configuration example of a force-sense device control system 1 to which the present embodiment can be applied. In this example, the control system 1 includes an image processing apparatus 10, a force-sense device control apparatus 70, the head-mounted display 100, a microphone 130, a camera 132, a force-sense device 134, and a server 200. The head-mounted display 100 is connected to the image processing apparatus 10 by wireless communication. However, a wired connection such as a USB may be used. The force-sense device control apparatus 70, the microphone 130, and the camera 132 are also connected to the image processing apparatus 10 in a wired or wireless manner.

The image processing apparatus 10 is connected to the server 200 via a network 8.

The server 200 transmits electronic content data such as videos and online games to the image processing apparatus 10. The image processing apparatus 10 performs necessary processing on the content data transmitted from the server 200 and transmits the processed data to the head-mounted display 100. Alternatively, the image processing apparatus 10 may internally process electronic content to generate images and audio data, and transmit the data to the head-mounted display 100. Note that the image processing apparatus 10 may be provided inside the head-mounted display 100. Furthermore, in the present embodiment, an apparatus for displaying images of content is not limited to a head-mounted display, and may be a flat-panel display such as a television receiver, a portable terminal, a projector, or the like.

In the case where the head-mounted display 100 is employed, the image processing apparatus 10 continuously acquires the position and posture of the user's head wearing the display in reference to the measurement values acquired by the motion sensor built in the head-mounted display 100, etc., for example, to generate a display image with a corresponding visual field. Representative examples of such a display technology include virtual reality (VR) which represents an image corresponding to the user's field of view, out of a three-dimensional space representing a virtual world and a captured panoramic image.

In addition, the image processing apparatus 10 may draw a virtual object (there are also cases where it is referred to as a VR object) at an appropriate position in the real-time image captured by the stereo camera 110, thereby achieving augmented reality (AR). Alternatively, the image processing apparatus 10 may reproduce general movies, videos, etc., with a fixed visual field regardless of the movement of the user's head. Since the display form of these pieces of electronic content itself is a general one, detailed description thereof will be omitted.

The microphone 130 supplies the voice uttered by the user to the image processing apparatus 10 as a signal. The camera 132 supplies the image processing apparatus 10 with real-time data of a video image in which a user's hand or the like is captured. The image processing apparatus 10 acquires the user's hand movements and gestures in reference to the captured image, and detects the contents of the operation. Then, a process corresponding to the contents of the operation is executed. Note that the camera 132 may be a visible light camera, a stereo camera, a multispectral camera, a depth camera, or the like, and the physical values to be detected are not limited to any particular value as long as the position and orientation of the subject can be obtained for each frame. Moreover, one of them may be introduced, or two or more of them may be introduced in combination.

The force-sense device 134 is an apparatus that transmits tactile sense for vibration etc., and force-sense information when worn by the user. For example, the force-sense device control apparatus 70 transmits a pseudo feel to the fingertip via the force-sense device 134 while the user is touching the virtual object with the finger. Note that details of the force-sense device 134 will be described later. Also, the force-sense device control apparatus 70 may sometimes simply be referred to as the control apparatus 70.

Incidentally, the shapes of the microphone 130, the camera 132, and the force-sense device 134 are not limited to those illustrated. For example, the microphone 130 may be part of the head-mounted display 100 or may be provided integrally with the camera 132. Also, instead of the camera 132, a motion sensor detecting finger movements, such as a virtual glove, by being worn by the user may be introduced. In this case, the force-sense device 134 may be attached to the virtual glove. Further, the function of the camera 132 may be served by the stereo camera 110 of the head-mounted display 100.

Figure 3:
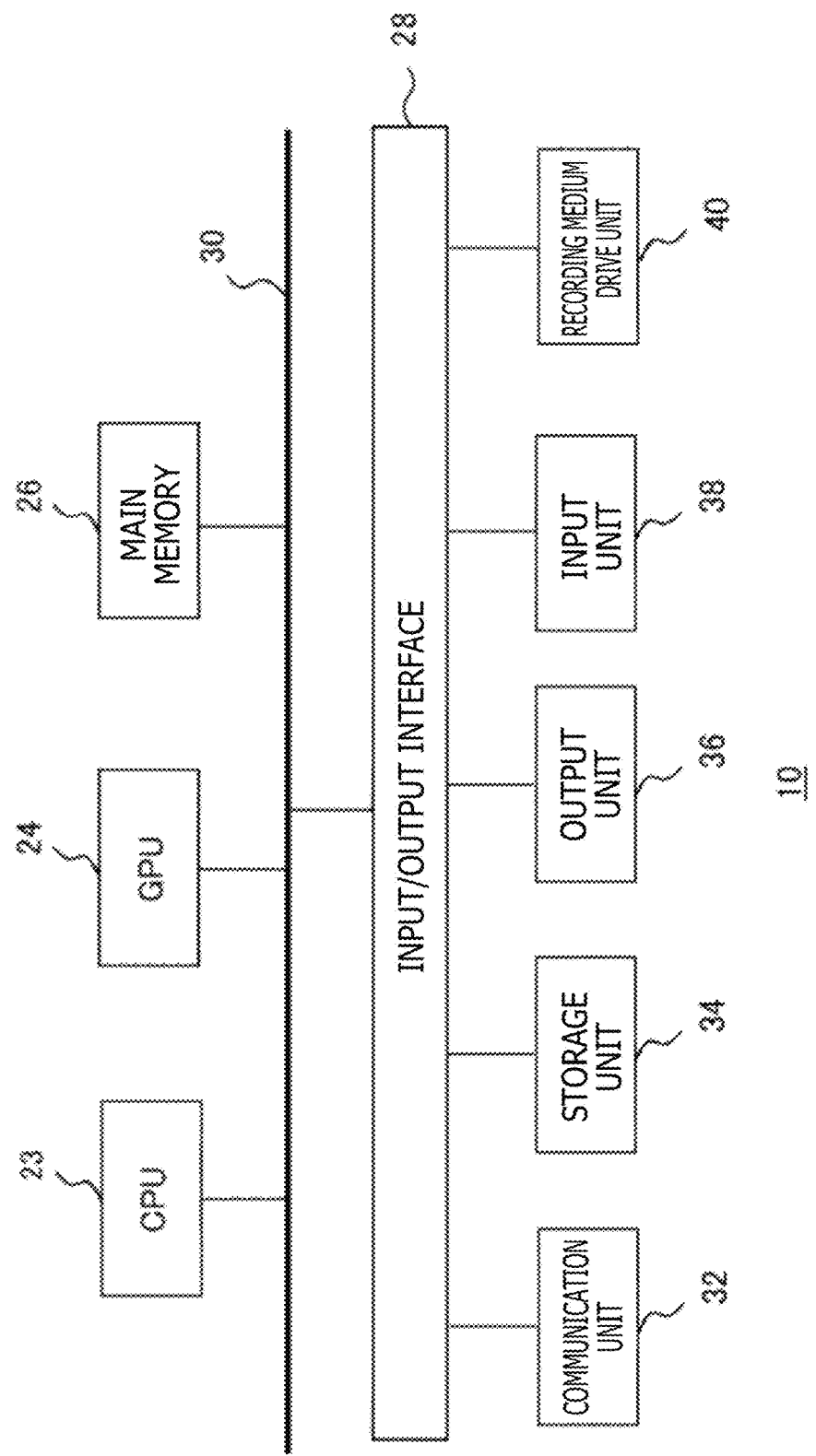
FIG. 3 is a diagram illustrating an internal circuit configuration of an image processing apparatus.

FIG. 3 is a diagram illustrating the internal circuit configuration of the image processing apparatus 10. The image processing apparatus 10 includes a CPU (Central Processing Unit) 23, a GPU (Graphics Processing Unit) 24, and a main memory 26. These parts are interconnected via a bus 30. An input/output interface 28 is also connected to the bus 30.

The input/output interface 28 includes a peripheral apparatus interface such as a USB and IEEE 1394, or a wired or wireless LAN network interface, and is connected with a communication unit 32 that establishes communication with the server 200 and the head-mounted display 100, a storage unit 34 such as a hard disk drive and a nonvolatile memory, an output unit 36 for outputting data to the head-mounted display 100 or the force-sense device 134, an input unit 38 for inputting data from the head-mounted display 100, the microphone 130, the camera 132, etc., and a recording medium drive unit 40 for driving a removable recording medium such as a magnetic disk, an optical disk, or a semiconductor memory.

The CPU 23 controls the entire image processing apparatus 10 by executing an operating system stored in the storage unit 34. Further, the CPU 23 executes various programs read from a removable recording medium and loaded into the main memory 26 or downloaded via the communication unit 32. The GPU 24 has a function of a geometry engine and a function of a rendering processor, and performs drawing processing in accordance with a drawing command from the CPU 23 and outputs the result to the output unit 36. The main memory 26 includes a RAM (Random Access Memory) and stores programs and data necessary for processing. Note that the character information which has been input in the present embodiment is stored in the main memory 26 by a user operation or at a predetermined timing.

Figure 4:
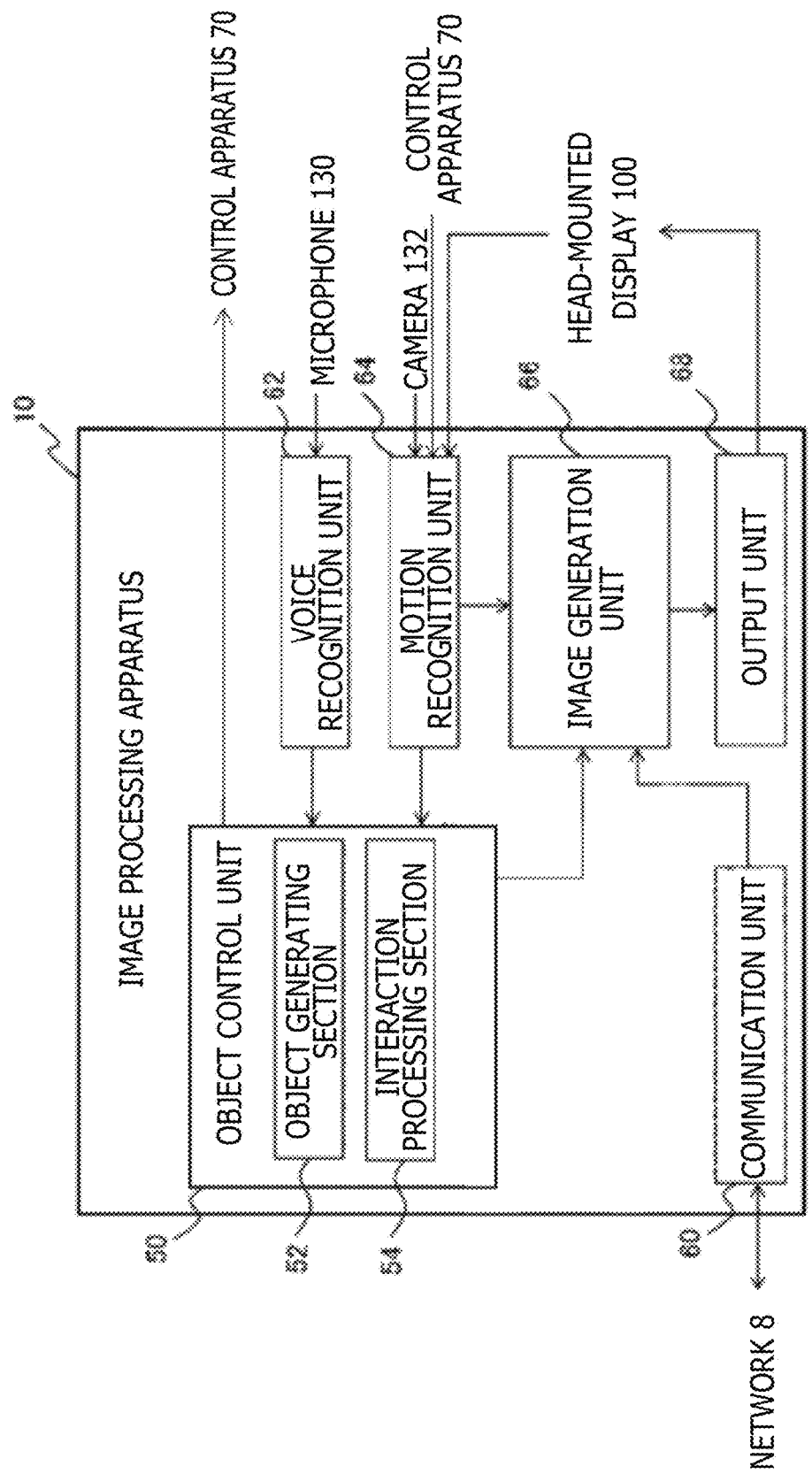
FIG. 4 is a diagram illustrating the configuration of functional blocks of the image processing apparatus.

FIG. 4 is a diagram illustrating the configuration of functional blocks of the image processing apparatus 10. Each functional block illustrated in the figure can be realized by a CPU, a GPU, a memory, etc., in terms of hardware, and by a program that is loaded from a recording medium into a memory and that exhibits various functions such as an information processing function, an image drawing function, a data input/output function, and a communication function in terms of software. Hence, those skilled in the art will understand that these functional blocks can be realized in various forms by hardware only, software only, or a combination thereof, and these are not limited to either one.

The image processing apparatus 10 includes a voice recognition unit 62 that recognizes a user's voice and converts the voice into character information, a motion recognition unit 64 that recognizes a user's motion or gesture, an image generation unit 66 that generates a display image, an output unit 68 that outputs data of the display image to the head-mounted display 100, an object control unit 50 that realizes interaction with the user by arranging virtual objects in a three-dimensional virtual space, and a communication unit 60 that communicates with other apparatuses via the network 8.

The voice recognition unit 62 acquires a signal of the voice uttered by the user from the microphone 130 and converts the signal into characters. Any of various practically used techniques may be applied to the voice recognition processing performed here.

The motion recognition unit 64 acquires images in which the user's hand or the like is captured from at least one of the camera 132 and the head-mounted display 100. In addition, the motion recognition unit 64 acquires information regarding the movement of the fingertip from the encoder of the force-sense device 134 or the like via the control apparatus 70, and recognizes the motion of the user's hand. Alternatively, the motion recognition unit 64 acquires measurement values of sensors worn by the user, for example. More specific details will be described later.

The image generation unit 66 generates images of content to be displayed on the head-mounted display 100. For example, for reproduction, the image generation unit 66 decodes and decompresses the video data subjected to compression-encoding and acquired by the communication unit 60. Alternatively, the image generation unit 66 itself may process the electronic game to render the images. The image generation unit 66 may generate the VR or AR images described above. The image generation unit 66 further projects the virtual object constructed by the object control unit 50 onto a view screen corresponding to the visual field of the head-mounted display 100, thereby including the virtual object in the display image.

As described above, in the case where the virtual space is constructed in the content, it is sufficient if the virtual objects arranged in this virtual space by the object control unit 50 are projected onto the view screen together with the object of the content. The output unit 68 outputs the display image data generated by the image generation unit 66 to the head-mounted display 100.

The object control unit 50 realizes a virtual interaction according to the user's motion, and changes the virtual object according to the result. Thus, the object control unit 50 also displays the image of the user's hand in the virtual space to visually express the interaction of the virtual object.

To be more specific, the object control unit 50 has an object generating section 52 and an interaction processing section 54. The object generating section 52 acquires character information obtained by converting voice with use of the voice recognition unit 62.

The images of the hand may be live-motion images captured by the stereo camera 110 of the head-mounted display 100 or the like, or images drawn by computer graphics, as long as the actual movement of the user's hand can be reflected in real time.

The object generating section 52 modifies the touched virtual object according to the position of the user's fingertip recognized by the motion recognition unit 64.

For example, when the user sticks out a finger to a position corresponding to the position of the virtual object arranged by the object generating section 52, the object generating section 52 detects that the user has touched the virtual object. Then, the touched virtual object is modified according to the motion of pushing or pinching the virtual object. The contents of modification may be switched according to the combination of fingers pinching the virtual object. Further, the contents of modification may be switched depending on whether the virtual object is touched with the pad of the finger or the back of the finger.

The communication unit 60 establishes communication with another apparatus such as the server 200 via the network 8, and acquires content data and supplies the data to the image generation unit 66.

The control apparatus 70 controls the force-sense device 134 to provide the user with haptic stimuli corresponding to the user's movement with respect to the virtual object. For example, as described above, the user's touching of the virtual object is haptically produced. Incidentally, the details of the force-sense device control apparatus 70 will be described later.

Figure 5A:
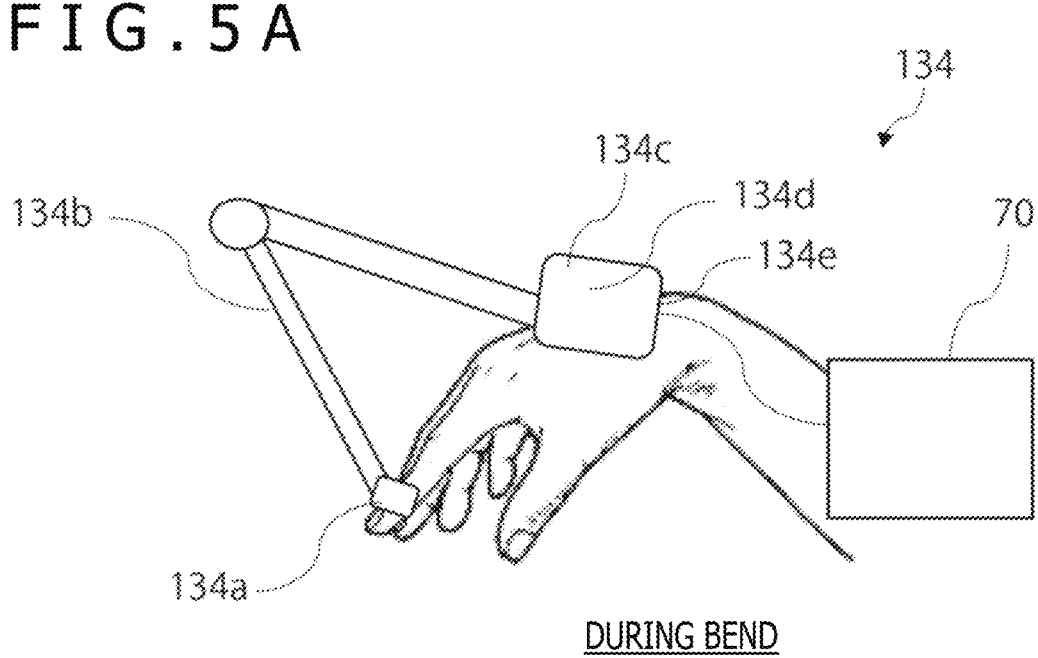
FIG. 5A is a diagram illustrating a configuration example of the force-sense device.
Figure 5B:
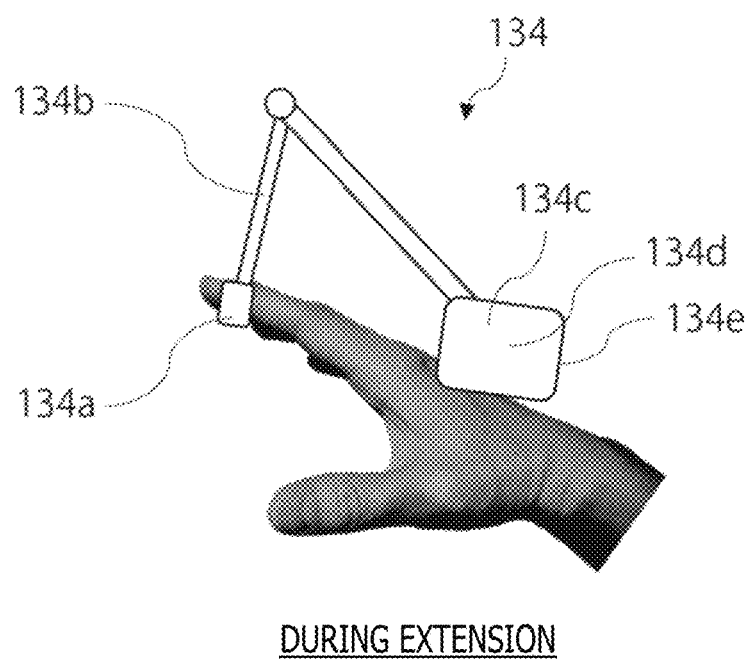
FIG. 5B is a diagram illustrating a state in which the small manipulator is extended.

FIG. 5A is a diagram illustrating a configuration example of the force-sense device 134. As illustrated in FIG. 5A, the force-sense device 134 has a finger fixing portion 134a, a small manipulator 134b, an actuator 134c, an angle detection sensor 134d, and a base 134e. FIG. 5A illustrates a state in which the small manipulator 134b is bent. FIG. 5B is a diagram illustrating a state in which the small manipulator 134b is extended.

Figure 6:
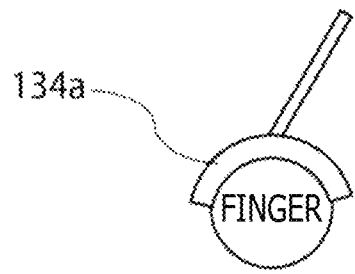
FIG. 6 is a diagram schematically illustrating a finger fixing portion.

FIG. 6 is a diagram schematically illustrating the finger fixing portion 134a. As illustrated in FIG. 6, the finger fixing portion 134a is a portion for fixing a human finger. For example, the portion includes an elastic material such as engineering plastics, phosphor bronze, and spring steel. Note that the finger fixing portion 134 according to the present embodiment corresponds to the acting portion.

Described with reference to FIGS. 5A and 5B again, the small manipulator 134b forms a group together with the actuator 134c and the angle detection sensor 134d. The actuator 134c and the angle detection sensor 134d are arranged inside the base 134e, for example. The actuator 134c is a DC electric motor, for example. The angle detection sensor 134d is an encoder, for example.

Terminal ends of the small manipulator 134b are connected to the finger fixing portion 134a and the base 134e. The base 134e is fixed to the back of a human hand, for example. In this case, it is fixed to the back of the hand by means of a belt, a restraint, or the like, any one of which is not illustrated. Alternatively, the base 134e may be fixed to the human hand by fixing the base 134e to a glove and wearing the glove.

By increasing the number of joints, the small manipulator 134b can apply a six-axis force, for example, to the finger fixing portion 134. When a finger is fixed to the finger fixing portion 134a and the small manipulator 2 is driven, the force-sense device 134 can apply force in six axial directions, for example, to the human fingertip according to the number of active joints. It should be noted that, in this embodiment, the case of a single-degree of freedom will be described in order to simplify the description, but the present invention is not limited to this. For example, any device that can give a fingertip a tactile sense, a force sense, or the like may be used. Further, the device may also be combined with other force-sense devices for electrical stimulation, gyroscopic effect, pneumatic pressure, and pressure sense.

Figure 7:
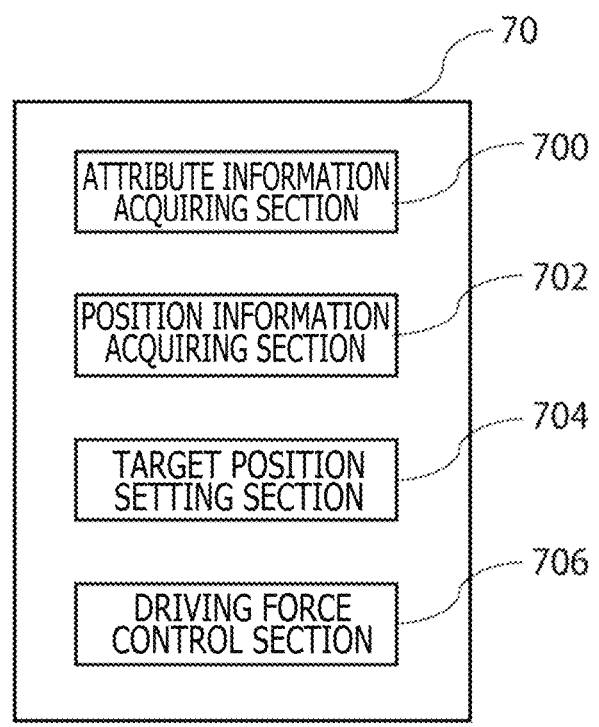
FIG. 7 is a block diagram illustrating a configuration example of a control apparatus for the force-sense device.

FIG. 7 is a block diagram illustrating a configuration example of the force-sense device control apparatus 70. As illustrated in FIG. 7, the force-sense device control apparatus 70 includes an attribute information acquiring section 700, a position information acquiring section 702, a target position setting section 704, and a driving force control section 706. The control apparatus 70 includes a CPU (Central Processing Unit) and a main memory that are not illustrated. The processing functions of each portion are configured by programs being executed stored in the main memory.

The attribute information acquiring section 700 acquires attributes of virtual objects. For example, the attribute information acquiring section 700 acquires information regarding fixed objects, movable objects, hardness, adhesiveness, etc., from the object generating section 52 as attributes of virtual objects.

The position information acquiring section 702 acquires position information regarding the virtual object from the object generating section 52, and the position of the user's fingertip from the motion recognition unit 64, and further acquires the status information of the small manipulator 134b from the angle detection sensor 134d (see FIGS. 5A and 5B).

The target position setting section 704 sets a target position for arranging the position of the user's fingertip, in reference to position information regarding the virtual object acquired from the object generating section 52. For example, if the attributes of the virtual object are a fixed object with high hardness, the target position is at the surface of the virtual object. On the other hand, in the case where the attribute of the virtual object is a movable object or an object with low hardness, the target position setting section 704 sets the target position in reference to the deformation information and movement information of the virtual object generated by the object generating section 52.

According to the position of the user's fingertip acquired from the motion recognition unit 64, the driving force control section 706 performs feedback control such that the position of the user's fingertip becomes the target position. More specifically, the driving force control section 706 controls the actuator 134*c* (see FIGS. 5A and 5B), and performs position control of the small manipulator 134*b* such that the position of the user's fingertip becomes the target position. Note that the driving force control section 706 according to the present embodiment corresponds to the control section.

Figure 8:
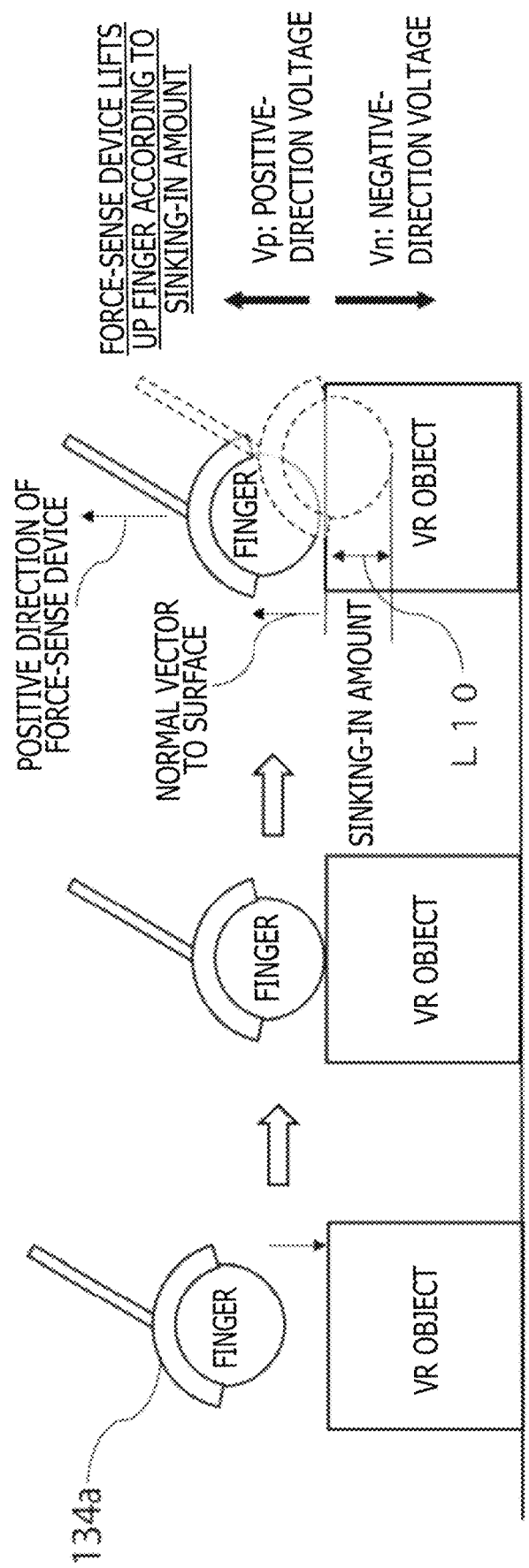
FIG. 8 is a diagram illustrating an example of control by a driving force control section.

FIG. 8 is a diagram illustrating an example of control by the driving force control section 706. FIG. 8 illustrates a case where the virtual object is a fixed object with high hardness. The left diagram illustrates the state before the user's fingertip touches the virtual object, the middle diagram illustrates the state at the moment when the user's fingertip has touched the virtual object, and the right diagram illustrates the state where the user's fingertip sinks into the virtual object beyond its surface.

In this case, the target position setting section 704 sets the surface of the virtual object as the target position. Accordingly, the driving force control section 706 controls the position of the small manipulator 134*b* according to the position of the user's fingertip acquired from the motion recognition unit 64, such that the user's fingertip is positioned on the surface of the virtual object.

The driving force control section 706 performs control to lock the small manipulator 134*b* at the moment when the user's fingertip touches the virtual object. As a result, the user's finger does not move.

Meanwhile, since the arm moves even if the finger is locked, a sinking-in amount L10 occurs as a deviation amount from the target position, as illustrated in the right diagram. Hence, according to the position of the user's fingertip obtained from the motion recognition unit 64, the driving force control section 706 performs control to lift the small manipulator 134*b* such that the user's finger is positioned at the target position. As a result, the mold manipulator 134*b* is controlled such that the user's finger is positioned on the surface of the virtual object that is the target position.

In this case, if the force-sense device 134 remains locked, the user feels heavy when the user tries to lift the finger, and is caused to have a feeling of strangeness. Hence, relative to a first force applied to the finger fixing portion 134*a* in the positive direction (first direction) away from the surface of the virtual object in the case where the fingertip is pushed in beyond the surface of the virtual object, the driving force control section 706 makes weaker the second force applied in the negative direction (second direction) which is opposite to the first direction in the case where the fingertip is to be placed back from the position where the fingertip has been pushed in.

For example, in the case where the fingertip is to be placed back from the position where the fingertip has been pushed in, the driving force control section 706 causes the motor voltage of the actuator 134*c* (see FIGS. 5A and 5B) not to be applied such that the force of the small manipulator 134*b* is not applied in the first direction of the normal vector to the surface of the touched virtual object. That is, according to the position of the user's fingertip acquired from the motion recognition unit 64, the driving force control section 706 performs control such that the force of the small manipulator 134*b* is not applied in the first direction of the normal vector in which the sinking-in amount L10 decreases. Here, a positive-direction potential Vp refers to the motor voltage potential of the actuator 134*c* (see FIGS. 5A and 5B) that applies a force in the upward normal direction (first direction) with respect to the finger fixing portion 134*a* of the small manipulator 134*b* in the case where the sinking-in amount L10 increases. In contrast, a negative-direction potential Vn here refers to the motor voltage potential of the actuator 134*c* (see FIGS. 5A and 5B) that applies a force in the downward normal direction (second direction) with respect to the finger fixing portion 134*a* of the small manipulator 134*b* in the case where the sinking-in amount L10 decreases.

Figure 9:
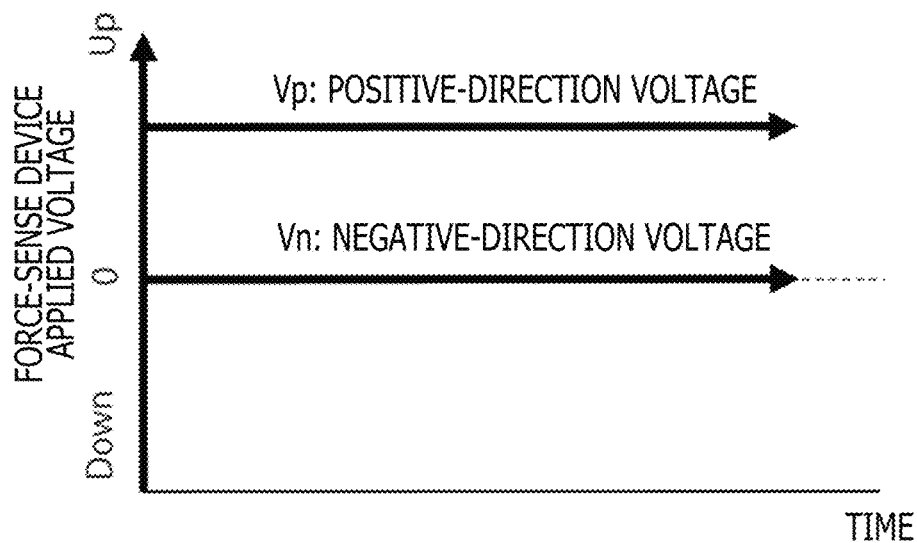
FIG. 9 is a diagram illustrating an example of controlling the motor voltage of an actuator in the right diagram of FIG. 8.

FIG. 9 is a diagram illustrating an example of controlling the motor voltage of the actuator 134*c* (see FIGS. 5A and 5B) in the right diagram of FIG. 8. The vertical axis indicates the magnitude of the applied voltage, and the horizontal axis indicates time. As illustrated in FIG. 9, the driving force control section 706 sets the negative-direction potential Vn to 0. As a result, the small manipulator 134*b* is unlocked in the first direction of the normal vector in which the sinking-in amount L10 decreases, and the force of the small manipulator 134*b* is not applied, so that the user's feeling of strangeness can be suppressed.

Figure 10:
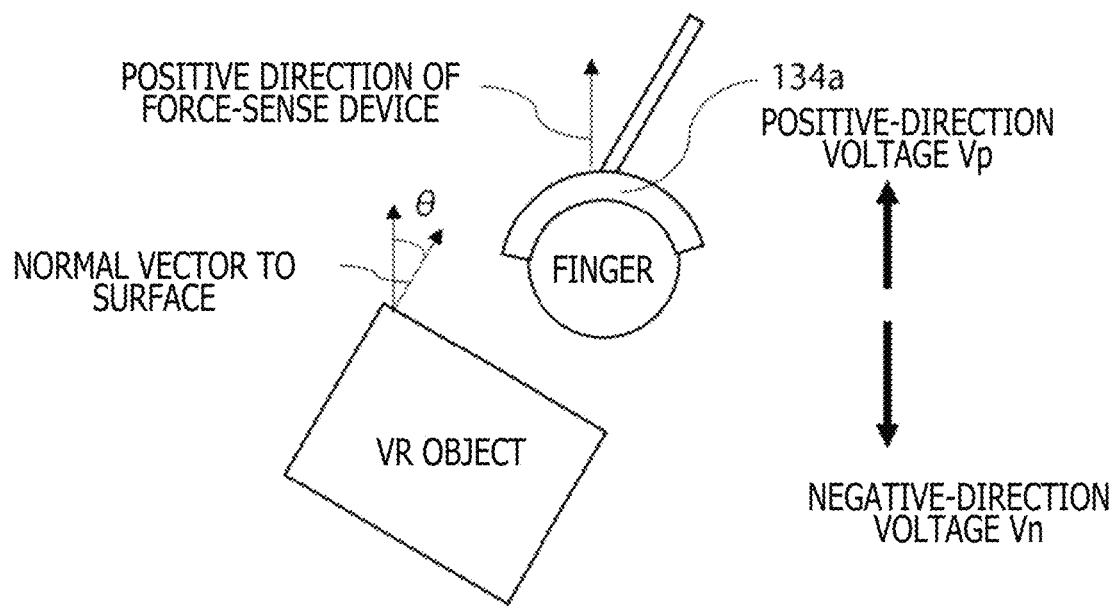
FIG. 10 is a diagram illustrating an example of control by the control apparatus for the force-sense device in a case where there is an angle.

FIG. 10 is a diagram illustrating an example of control performed by the force-sense device control apparatus 70 in the case where there is an angle θ between the positive direction of the force-sense device 134 and the normal vector to the surface of the virtual object. FIG. 8 illustrates the case where the virtual object is a fixed and rigid object. In the case where there is an angle θ between the positive direction of the force-sense device 134 and the normal vector (first direction) to the surface of the virtual object, the driving force control section 706 performs control by deeming Vn=0 is satisfied, when the angle θ is acute. Even in such a case, surface friction can be ignored because the virtual object has a rigid body. Accordingly, the small manipulator 134*b* is unlocked in the normal vector direction (first direction) in which the sinking-in amount L10 decreases. As a result, the force of the small manipulator 134*b* is not applied in the first direction, so that the user's feeling of strangeness can be suppressed.

Figure 11:
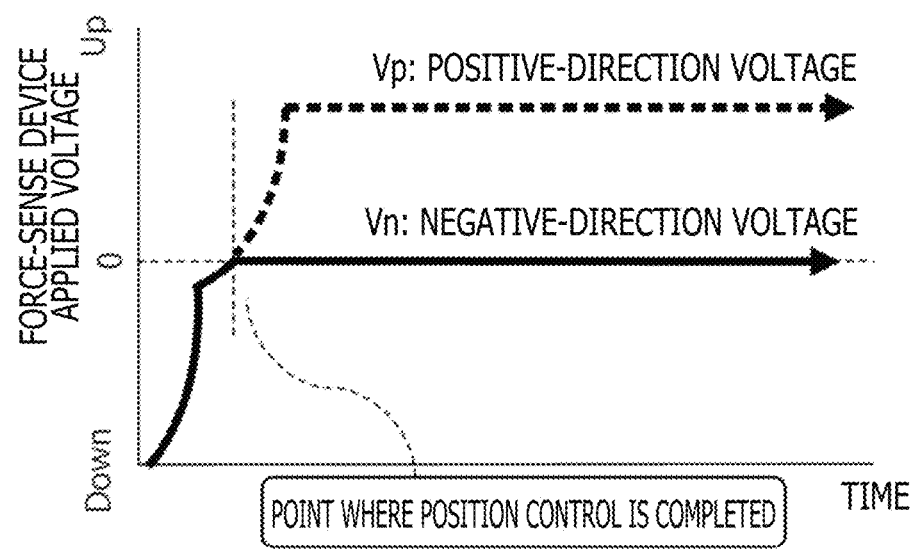
FIG. 11 is a diagram illustrating an example of control for the motor voltage of the actuator during feedback control.

FIG. 11 is a diagram illustrating an example of controlling the motor voltage of the actuator 134*c* (see FIGS. 5A and 5B) during feedback control. The vertical axis indicates the magnitude of the applied voltage, and the horizontal axis indicates time. As illustrated in FIG. 11, the application of the negative-direction potential Vn is continued while the driving force control section 706 is performing feedback control with respect to the target position. Further, the negative-direction potential Vn is set to 0 after the feedback control ends. In the present embodiment, suppressing the negative-direction potential Vn is referred to as correction. If the negative-direction potential Vn is corrected before the feedback control ends, the overshoot in the negative direction cannot be suppressed, and the position control to the target position becomes difficult. In contrast, since the driving force control section 706 according to the present embodiment performs the process for correcting the negative-direction potential Vn after the feedback control ends, shifting the position of the fingertip to the target position can be controlled.

Figure 12:
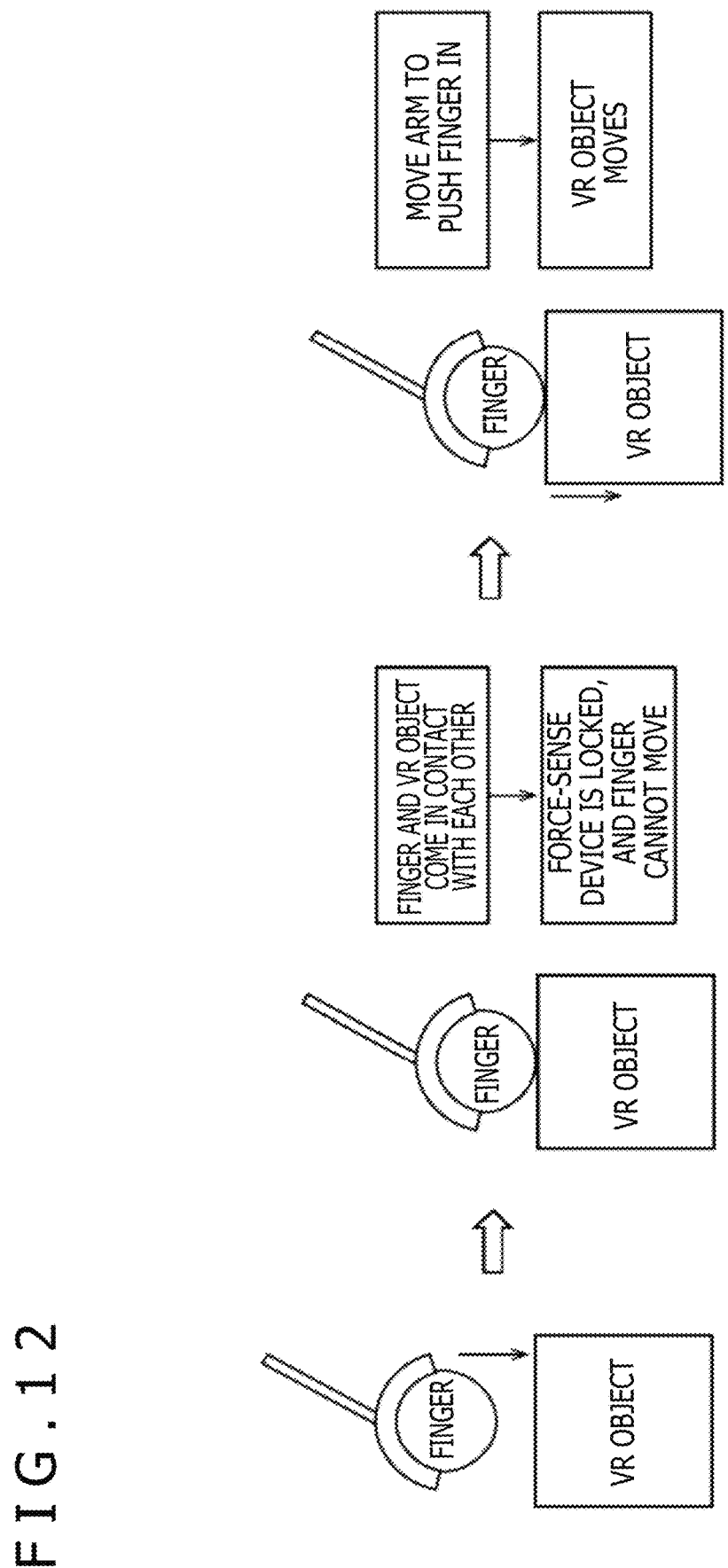
FIG. 12 is a diagram illustrating an example of control for a moving object by the control apparatus for the force-sense device.

FIG. 12 is a diagram illustrating an example of the control by the force-sense device control apparatus 70 for a moving object. FIG. 12 illustrates a case where the virtual object is a moving object with high hardness. The left diagram illustrates the state before the user's fingertip touches the virtual object, the middle diagram illustrates the state at the moment when the user's fingertip has touched the virtual object, and the right diagram illustrates the state where the user's fingertip pushes down the virtual object. The driving force control section 706 performs control to lock the small manipulator 134*b* at the moment when the user's fingertip touches the virtual object. As a result, the user's finger does not move. Alternatively, the voltage Vp may be corrected according to the easiness of movement of the moving object, such that the moving object can be pushed down with a finger.

On the other hand, since the arm moves even when the finger is locked, the object generating section 52 moves the virtual object according to the amount of movement of the user's fingertip, as illustrated in the right diagram. In this case, the driving force control section 706 gives priority to the position control when the user's fingertip is moving while pushing the virtual object, in order to stop correcting the negative-direction potential Vn. As a result, overshoot is suppressed, and unnatural separation between the fingertip and the virtual object is suppressed. In such a way, while the virtual object is being pushed and moved, the finger is unlikely to be detached from the object, and thus, it is possible to suppress the user's feeling of strangeness and maintain control accuracy simultaneously by correcting the voltage value in the vertically downward direction after stopping the movement of the object.

Figure 13:
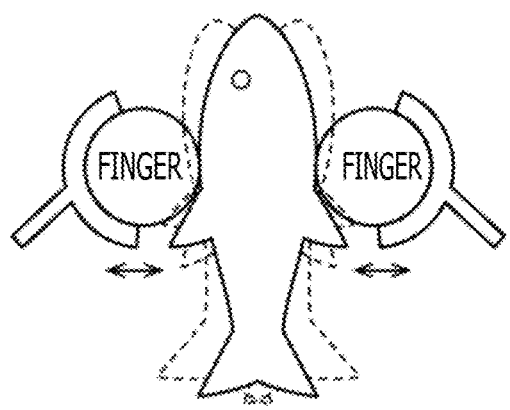
FIG. 13 is a diagram schematically illustrating a case where the virtual object moves by itself.

FIG. 13 is a diagram schematically illustrating a case where a virtual object moves by itself. As illustrated in FIG. 13, in the case where the virtual object is a fish and moves by itself, for example, the application of correction to the negative-direction potential Vn is stopped. If correction control is applied while a user is holding a virtual object that moves by itself, such as a fish, the movement may be restricted in one direction and the user may have a feeling of strangeness. Hence, the driving force control section 706 disables the correction control in the case of contacting a virtual object that moves by itself. As a result, the feeling of strangeness caused by movement being restricted in one direction can be suppressed.

Figure 14:
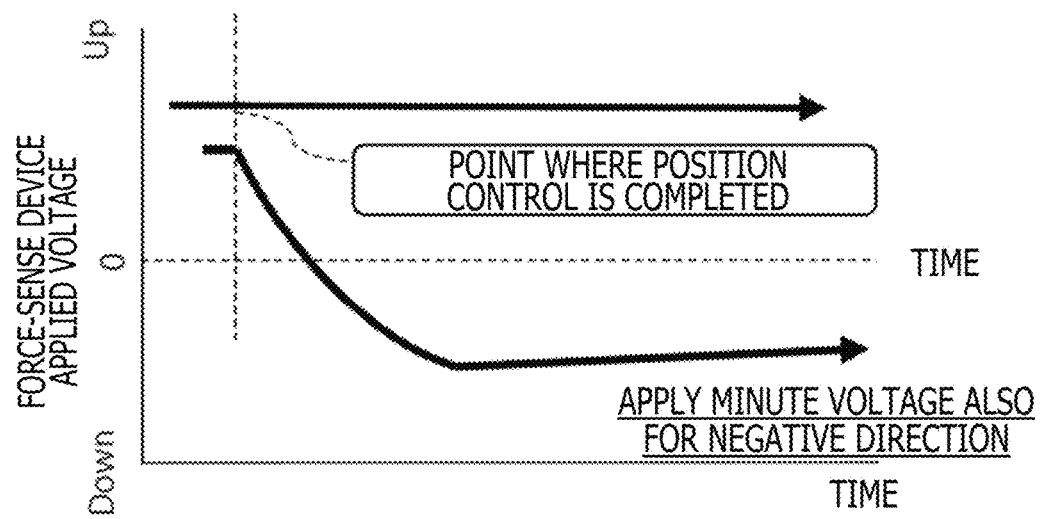
FIG. 14 is a diagram illustrating an example of motor voltage control during feedback control in a case where the virtual object has viscosity.

FIG. 14 is a diagram illustrating an example of controlling the motor voltage of the actuator 134c (see FIGS. 5A and 5B) during feedback control in the case where the virtual object has viscosity. The vertical axis indicates the magnitude of the applied voltage, and the horizontal axis indicates time. As illustrated in FIG. 14, the application of the negative-direction potential Vn is continued while the driving force control section 706 is performing feedback control with respect to the target position. Meanwhile, the driving force control section 706 maintains minute negative-direction potential Vn even after the feedback control ends. As a result, in the case where the virtual object has viscosity, the feel of the finger sticking to the virtual object can be maintained.

Figure 15:
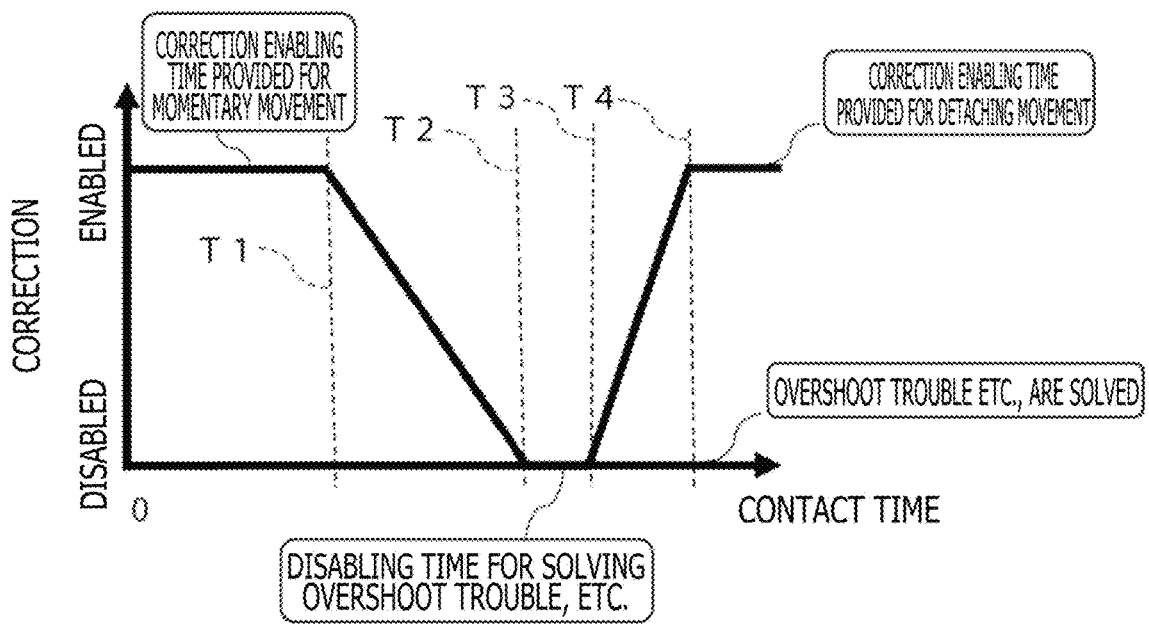
FIG. 15 is a diagram illustrating a control example of changing correction processing according to a length of contact time between the virtual object and a finger.

FIG. 15 is a diagram illustrating a control example of changing the correction processing to the negative-direction potential Vn according to the length of contact time between the virtual object and the finger. The vertical axis indicates whether the correction processing is enabled or disabled, and the horizontal axis indicates the length of contact time between the virtual object and the finger. For example, as in a tap process, in the case where the length of contact time between the virtual object and the finger is shorter than the predetermined value T1, the driving force control section 706 enables the correction processing. That is, the driving force control section 706 sets the negative-direction potential Vn to 0 in the case where the length of contact time between the virtual object and the finger is shorter than the predetermined value T1. As a result, a feeling of strangeness is suppressed in the motion of instantly detaching the finger from the virtual object, such as a tap process.

Further, since interference between the virtual object and the finger occurs when the length of contact time becomes longer than the predetermined value T1, the degree of correction is increased according to the time of contact. This makes it possible to reduce a feeling of strangeness while enabling feedback control for aligning the finger with the surface position of the virtual object.

Further, when the length of contact time becomes longer than the predetermined value T2, the driving force control section 706 needs to perform drive control to align the finger with the surface position of the virtual object. Hence, the driving force control section 706 disables the correction processing and gives priority to the feedback control. This makes it possible to suppress overshoot and the like.

Further, when the length of contact time becomes longer than a predetermined value T3, since the drive control for aligning the finger with the surface position of the virtual object is terminated, the driving force control section 706 strengthens the correction processing as time elapses. As a result, a feeling of strangeness can be reduced as time elapses. Further, when the length of contact time becomes longer than a predetermined value T4, the negative-direction potential Vn is set to 0, and the correction processing is enabled completely. In such a way, changing the correction processing for the negative-direction potential Vn according to the length of contact time between the virtual object and the finger makes it possible to improve the accuracy of position control and reduce a feeling of strangeness simultaneously.

FIGS. 16A, 16B, 16C, 16D, and 16E depict diagrams illustrating an example of control by the driving force control section 706 in a case where, after taking the action of detaching the finger from the virtual object, the user pushes in the finger without detaching it. FIG. 16A illustrates the state at the moment when the user's fingertip has touched the virtual object, FIG. 16B illustrates the state where the user's fingertip sinks into the surface of the virtual object, and FIG. 16C illustrates the state in which the finger is released from the state illustrated in FIG. 16B. FIG. 16D illustrates a state in which the fingertip of the user is pushed into the virtual object again C without the finger being released from the state illustrated in Figure, and FIG. 16E illustrates a state in which the finger is released from the state illustrated in FIG. 16D. As illustrated in FIGS. 16A, 16B, 16C, 16D, and 16E, in the case where, after taking the action of detaching the finger from the virtual object, the user pushes in the finger without detaching it from the virtual object, correction processing may be performed after position control is performed based on the point where the finger is pushed in again. In such a way, even if the normal vector changes according to the movement of the finger, the correction can be recalculated at the timing when the finger is pushed in again. As a result, since the finger in contact with the virtual object remains stationary on the surface of the virtual object, there is an effect of causing no sense of strangeness in the image.

Figure 17:
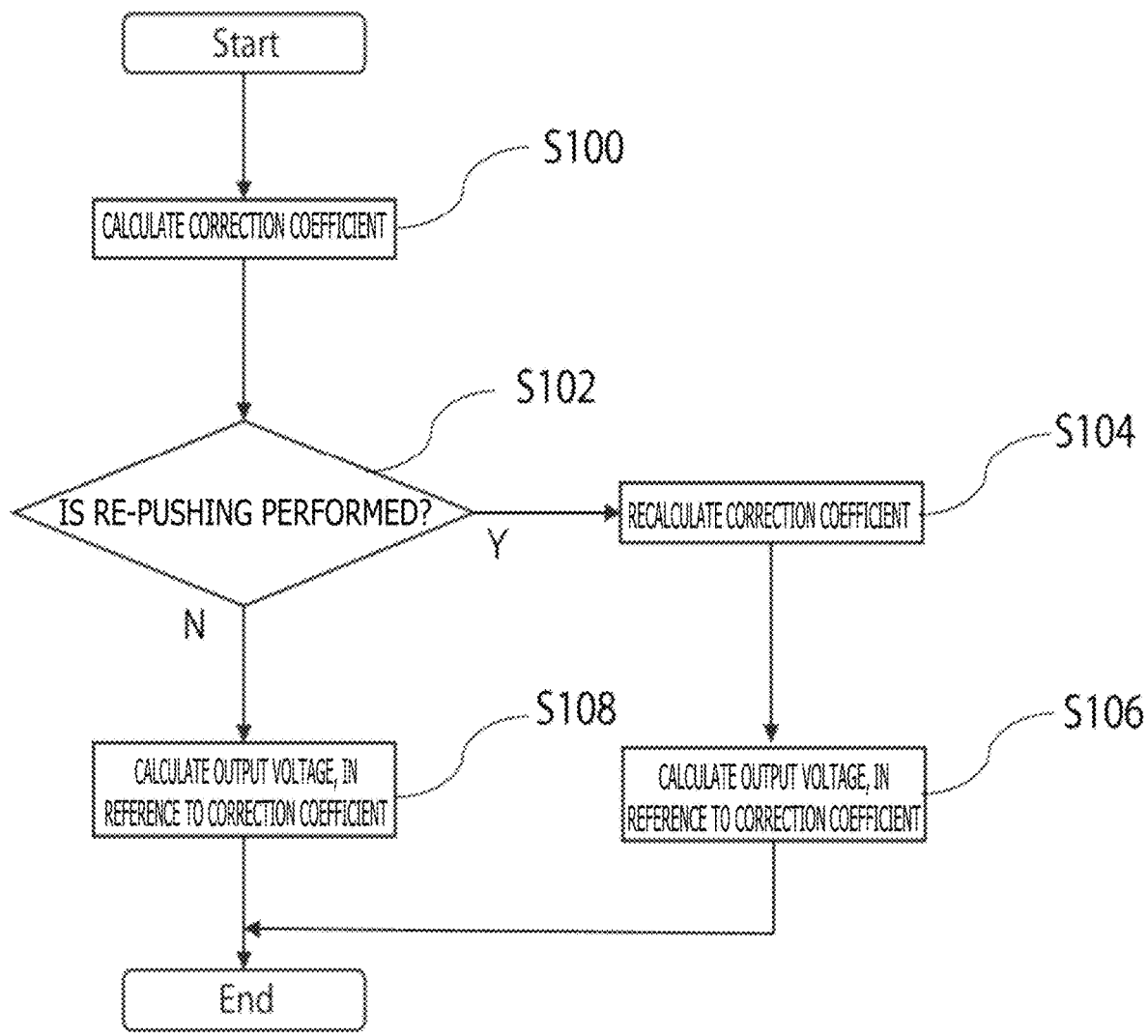
FIG. 17 is a flow chart illustrating an example of processing by the control apparatus for the force-sense device.

FIG. 17 is a flow chart illustrating a processing example of the force-sense device control apparatus 70. Here, the case where the finger touches the virtual object and re-pushing is caused will be described.

The attribute information acquiring section 700 acquires the attributes of the virtual object, and the driving force control section 706 sets the correction coefficient of the negative-direction potential Vn according to the attributes (step S100).

Next, the driving force control section 706 determines whether or not the re-pushing has occurred again, according to the position of the user's fingertip acquired from the motion recognition unit 64 (step S102).

In the case where it is determined that re-pushing in has occurred (Y in step S102), the driving force control section 706 recalculates the correction coefficient according to the length of contact time to change the direction of the force of the small manipulator 134b according to the normal to the surface of the virtual object (step S104). Then, the motor voltage of the actuator 134c (see FIGS. 5A and 5B) is controlled with respect to the direction in which the amount of deviation decreases, with use of the value of the negative-direction potential Vn based on the correction coefficient (step S106), and then the processing is ended.

On the other hand, in the case where the driving force control section 706 determines that re-pushing in has not occurred (N in step S102), the driving force control section 706 controls the motor voltage of the actuator 134c (see FIGS. 5A and 5B) with respect to the direction in which the amount of deviation decreases, with use of the negative-direction potential Vn based on the correction coefficient, without recalculating the correction coefficient (step S108), and then ends the processing.

As described above, according to the present embodiment, the position information acquiring section 702 acquires position information regarding the surface of the virtual object and the position information regarding the fingertip, and the driving force control section 706 performs position control of the finger fixing portion 134a that applies a force to the fingertip, in reference to these pieces of position information. In this case, the driving force control section 706 makes the second force applied in the negative direction (second direction) which is the opposite direction to the positive direction (first direction), in the case where the fingertip is to be placed back from the position where the fingertip has been pushed in, weaker than the first force applied to the finger fixing portion 134a in the positive direction away from the surface of the virtual object in the case where the fingertip is pushed in beyond the surface of the virtual object. As a result, in the case where the fingertip is to be placed back from the position where the fingertip has been pushed in further beyond the surface of the virtual object, less force is applied in the negative direction, thereby suppressing the strangeness felt by the user.

It is to be noted that this technique can take the following configurations.

(1)

A control apparatus for a force-sense device, the apparatus including:
- a position information acquiring section that acquires position information regarding a surface of a virtual object and position information regarding a fingertip;
- a control section that controls, in reference to the pieces of position information, a position of an acting portion that applies a force to the fingertip, in which
- the control section makes a second force weaker than a first force, the first force being applied to the acting portion in a first direction away from the surface of the virtual object in a case where the fingertip is pushed in further beyond the surface of the virtual object, and the second force being applied in a second direction opposite to the first direction in a case where the fingertip is to be placed back from a position where the fingertip has been pushed in.

(2)

The control apparatus for a force-sense device according to (1), in which
in a case where a position of the surface of the virtual object and a position of the fingertip have a predetermined relation, the control section fixes the position of the acting portion such that the fingertip does not move.

(3)

The control apparatus for a force-sense device according to (2), in which
the control section cancels the fixing in a case where the fingertip moves in the first direction.

(4)

The control apparatus according to (3), in which
the acting portion is fixed to a manipulator, and
the control section controls a voltage of a motor that drives the manipulator.

(5)

The control apparatus according to (4), in which
the first direction is a direction normal to the surface of the virtual object.

(6)

The control apparatus according to (5), in which
the control section controls a first voltage of a motor that applies a force to the acting portion in the first direction and a second voltage of a motor that applies a force to the acting portion in the second direction.

(7)

The control apparatus according to (6), in which
the control section performs control such that the second voltage becomes 0 or close to 0 in a case where the fixing is to be cancelled.

(8)

The control apparatus according to (6), in which
the control section performs control to suppress the second voltage by correction processing for reducing the second voltage.

(9)

The control apparatus according to (8), in which
the control section performs feedback processing for moving the fingertip to a target position based on the surface of the virtual object, and performs the correction processing after the feedback processing is completed.

(10)

The control apparatus according to (8), in which
the control section performs the correction processing when the virtual object is a movable object and after the virtual object stops in conjunction with a movement of the fingertip.

(11)

The control apparatus according to (8), in which
the control section stops the correction processing in a case where the virtual object itself moves.

(12)

The control apparatus according to (8), in which
the control section changes a degree of correction for reducing the second voltage, according to a length of contact time between the surface of the virtual object and the fingertip.

(13)

The control apparatus according to (8), in which
the control section maintains the second voltage of a predetermined value, in a case where the surface of the virtual object has an attribute indicating viscosity.

(14)

A method for controlling a force-sense device, the method including:
- a position information acquiring step of acquiring position information regarding a surface of a virtual object and position information regarding a fingertip; and a controlling step of controlling, in reference to the pieces of position information, a position of an acting portion that applies a force to the fingertip, in which, in the controlling step, a second force is made weaker than a first force, the first force being applied to the acting portion in a first direction away from the surface of the virtual object in a case where the fingertip is pushed in further beyond the surface of the virtual object, and the second force being applied in a second direction opposite to the first direction in a case where the fingertip is to be placed back from a position where the fingertip has been pushed in.

(15)

A control system for a force-sense device, the system including:

an image processing apparatus that displays a virtual object in a virtual space corresponding to a real space; and a control apparatus that controls a force-sense device that gives a sense of force to a fingertip of a user, the control apparatus including a position information acquiring section that acquires position information regarding a surface of the R object and position information regarding the fingertip, and a control section that controls, in reference to the pieces of position information, a position of an acting portion that applies a force to the fingertip, and the control section making a second force weaker than a first force, the first force being applied to the acting portion in a first direction away from the surface of the virtual object in a case where the fingertip is pushed in further beyond the surface of the virtual object, and the second force being applied in a second direction opposite to the first direction in a case where the fingertip is to be placed back from a position where the fingertip has been pushed in.

Aspects of the present disclosure are not limited to the individual embodiments described above, and include various modifications that can be conceived of by those skilled in the art, and the effects of the present disclosure are not limited to the above-described contents either. That is, various additions, modifications, and partial deletions are possible without departing from the conceptual idea and gist of the present disclosure derived from the contents defined in the claims and equivalents thereof.

REFERENCE SIGNS LIST

1: Force-sense device control system
70: Force-sense device control apparatus
134: Force-sense device
134a: Finger fixing portion
134b: Small manipulator
134c: Actuator
702: Position information acquiring section
706: Driving force control section

The invention claimed is:

1. A control apparatus for a force-sense device, the control apparatus comprising:

a position information acquiring section configured to acquire first position information regarding a surface of a virtual object and second position information regarding a fingertip; and a control section configured to:

control, based on the first position information and the second position information, a position of an acting portion that applies a force to the fingertip; and make a second force weaker than a first force, wherein the first force is applied to the acting portion in a first direction away from the surface of the virtual object in a case where the fingertip is pushed in farther beyond the surface of the virtual object, the first direction is normal to the surface of the virtual object, and the second force is applied in a second direction opposite to the first direction in a case where the fingertip is to be placed back from a position where the fingertip is pushed in farther beyond the surface of the virtual object;

fix, in a case where a position of the surface of the virtual object and the position of the fingertip have a specific relation, the position of the acting portion such that the fingertip does not move;

cancel the fixing in a case where the fingertip moves in the first direction;

control a first voltage of a motor that applies a force to the acting portion in the first direction;

control a second voltage of the motor that applies a force to the acting portion in the second direction, wherein the acting portion is fixed to a manipulator; and perform control to suppress the second voltage by a correction process to reduce the second voltage.

2. The control apparatus according to claim 1, wherein the control section is further configured to perform control such that the second voltage becomes 0 or close to 0 in a case where the fixing is cancelled.

3. The control apparatus according to claim 1, wherein the control section is further configured to:

perform feedback processing for moving the fingertip to a target position based on the surface of the virtual object, and perform the correction process after the feedback process is completed.

4. The control apparatus according to claim 1, wherein the control section is further configured to perform the correction process, based on the virtual object is a movable object and subsequent to the virtual object stops in conjunction with the movement of the fingertip.

5. The control apparatus according to claim 1, wherein the control section is further configured to stop the correction process in a case where the virtual object itself moves.

6. The control apparatus according to claim 1, wherein the control section is further configured to change a degree of correction for the reduction of the second voltage, according to a length of contact time between the surface of the virtual object and the fingertip.

7. The control apparatus according to claim 1, wherein the control section is further configured to maintain the second voltage of a specific value, in a case where the surface of the virtual object has an attribute indicating viscosity.

8. A method for controlling a force-sense device, the method comprising:

acquiring first position information regarding a surface of a virtual object and second position information regarding a fingertip;

controlling, based on the first position information and the second position information, a position of an acting portion that applies a force to the fingertip;

making a second force weaker than a first force, wherein
the first force is applied to the acting portion in a first direction away from the surface of the virtual object in a case where the fingertip is pushed in further farther beyond the surface of the virtual object,
the first direction is normal to the surface of the virtual object, and
the second force is applied in a second direction opposite to the first direction in a case where the fingertip is to be placed back from a position where the fingertip is pushed in farther beyond the surface of the virtual object;

fixing, in a case where a position of the surface of the virtual object and the position of the fingertip have a specific relation, the position of the acting portion such that the fingertip does not move;

cancelling the fixing in a case where the fingertip moves in the first direction;

controlling a first voltage of a motor that applies a force to the acting portion in the first direction;

controlling a second voltage of the motor that applies a force to the acting portion in the second direction, wherein
the acting portion is fixed to a manipulator; and performing control to suppress the second voltage by a correction process to reduce the second voltage.

9. A control system for a force-sense device, the control system comprising:
an image processing apparatus configured to display a virtual object in a virtual space corresponding to a real space; and
a control apparatus configured to control the force-sense device that gives a sense of a force to a fingertip of a user, wherein the control apparatus comprises:
a position information acquiring section configured to acquire first position information regarding a surface of the virtual object and second position information regarding the fingertip, and
a control section configured to:
control, based on the first position information and the second position information, a position of an acting portion that applies the force to the fingertip; wherein
make a second force weaker than a first force, wherein
the first force is applied to the acting portion in a first direction away from the surface of the virtual object in a case where the fingertip is pushed in farther beyond the surface of the virtual object,
the first direction is normal to the surface of the virtual object, and
the second force is applied in a second direction opposite to the first direction in a case where the fingertip is to be placed back from a position where the fingertip is pushed in her farther beyond the surface of the virtual object;
fix, in a case where a position of the surface of the virtual object and the position of the fingertip have a specific relation, the position of the acting portion such that the fingertip does not move;
cancel the fixing in a case where the fingertip moves in the first direction;
control a first voltage of a motor that applies a force to the acting portion in the first direction,
control a second voltage of the motor that applies a force to the acting portion in the second direction, wherein
the acting portion is fixed to a manipulator; and
perform control to suppress the second voltage by a correction process to reduce the second voltage.

* * * * *